(12) United States Patent
Aida et al.

(10) Patent No.: US 7,625,516 B2
(45) Date of Patent: Dec. 1, 2009

(54) METHOD FOR MANUFACTURING SHEET MOLDED BODY AND INSERT MOLDED BODY

(75) Inventors: Takahiro Aida, Kanagawa-ken (JP); Takeo Kobayashi, Kanagawa-ken (JP); Yukio Ueda, Tokyo (JP); Hiroshi Fujita, Tokyo (JP)

(73) Assignee: C.I. Kasei Company, Limited, Tokyo (JP)

( * ) Notice: Subject to any disclaimer, the term of this patent is extended or adjusted under 35 U.S.C. 154(b) by 112 days.

(21) Appl. No.: 11/849,149

(22) Filed: Aug. 31, 2007

(65) Prior Publication Data
US 2009/0057942 A1    Mar. 5, 2009

(51) Int. Cl.
*B29C 51/06* (2006.01)
(52) U.S. Cl. .................. 264/544; 264/547; 264/548; 264/549; 264/572
(58) Field of Classification Search ............ 264/544, 264/547–549, 572
See application file for complete search history.

(56) References Cited

U.S. PATENT DOCUMENTS 6,063,326 A * 5/2000 Kotha et al. ............... 264/547
6,293,803 B1 * 9/2001 Rust et al. .................... 439/33
2003/0170460 A1 * 9/2003 Sienkiewicz et al. ...... 428/411.1
2006/0243372 A1 * 11/2006 Huber ........................ 156/152

FOREIGN PATENT DOCUMENTS

JP         2001-225350         8/2001

* cited by examiner

*Primary Examiner*—Joseph S. Del Sole
*Assistant Examiner*—Stephen Sollenberger
(74) *Attorney, Agent, or Firm*—Knobbe, Martens, Olson & Bear, LLP (57) ABSTRACT

A manufacturing method for a sheet molded body having a desired three dimensional shape and an excellent quality of the design, which has no crease, by uniformly expanding a decorated sheet prior to molding, and closely contacting the decorate sheet to the surface of a male die. In the manufacturing method, the pressure at the front side of the decorated sheet is lowered relative to that at the back side. An arm means is then moved towards the decorated sheet from the back side of the decorated sheet so that the decorated sheet is inverted by increasing the pressure at the front side relative to that at the back side. The decorated sheet is then three dimensionally formed along the surface of the male die by, while pressing the male die from the back side and moving the arm means backwards, increasing the pressure at the front side.

10 Claims, 8 Drawing Sheets

METHOD FOR MANUFACTURING SHEET MOLDED BODY AND INSERT MOLDED BODY

BACKGROUND OF THE INVENTION

1. Field of the Invention

The present invention relates to a method for manufacturing a sheet molded body made from a decorated sheet having a design, and a method for manufacturing an insert molded body which includes a resin molded body integrated with the sheet molded body.

2. Background Art

An insert molded body in which a decorated sheet having a pattern or the like integrated into the surface of a resin molded body has been widely used in interior or exterior parts of automobiles, for example.

As an example of methods for manufacturing the insert molded body, the following method is disclosed in Japanese Laid-Open Patent Application No. 2001-225350.

In the above-mentioned method, a decorated sheet which is heated and softened is firstly absorbed by vacuum suction onto the surface of a vacuum molding male die so that it closely contacts the surface and is three dimensionally formed into a shape corresponding to the surface of the male die. Then, the three dimensionally formed decorated sheet is placed in an injection molding female die. After this, the injection molding dies are mold closed, and a melted resin is introduced into the cavity. In this manner, an insert molded body, which includes the decorated sheet and a resin molded body integrally formed with the back surface side of the decorated sheet, is obtained.

However, in the process of three dimensionally forming the decorated sheet in the above-mentioned method, air tends to remain between the vacuum molding male die and the decorated sheet, and there are cases that the vacuum molding male die does not closely contact the decorated sheet. If the decorated sheet is three dimensionally formed while there is no close contact with the vacuum molding male die, there is a danger that a crease is generated on the decorated sheet after molding or the desired shape of the decorated sheet cannot be obtained. As a result, problems may also be caused for an insert molded body which uses the decorated sheet, such as poor contact between the decorated sheet and the resin molded body, or a deterioration in appearance.

Also, in the method described in Japanese Laid-Open Patent Application No. 2001-225350, since the heated and softened decorated sheet is vacuum absorbed onto the surface of a vacuum molding male die without expanding the decorated sheet, a portion of the decorated sheet which closely contacts the surface of the male die by vacuum suction does not expand significantly and only the portions that contact the surrounding surfaces of the male die rapidly expand during the vacuum molding. Accordingly, since the degree of expansion of the decorated sheet thus obtained differs from portion to portion, the pattern thereof sometimes appears to be different depending on the portion, and the quality of the design is compromised. Also, since the thickness of the portion which contacts the surrounding surfaces of the male die becomes extremely thin, a crease may be generated in that portion or poor contact with a resin molded body may be induced during an insertion molding, and defective products tend to be produced.

SUMMARY OF THE INVENTION

The present invention has been achieved in consideration of the above situation, and an object of the invention is to produce a sheet molded body which is formed into a desired three dimensional shape by uniformly expanding a decorated sheet prior to three dimensionally forming the decorated sheet and contacting the decorated sheet with a surface of the male die in an excellent manner, so that no crease is generated on the decorated sheet and the sheet molded body has an excellent quality of the design.

The method for manufacturing a sheet molded body according to the present invention includes: a draping process in which a pressure at a front surface side of a heated decorated sheet is lowered relative to a pressure at a back surface side of the decorated sheet so that the decorated sheet expands toward the front surface side; an inversion process in which an arm means is moved toward the decorated sheet from the back surface side of the decorated sheet so that the arm means contacts at least a periphery portion of the decorated sheet, and while supporting the decorated sheet by the arm means in this manner, the decorated sheet is expanded towards the back surface side by increasing the pressure at the front surface side of the decorated sheet relative to the pressure at the back surface side of the decorated sheet; and a sheet molding process in which the decorated sheet is three dimensionally molded along a surface of at least one sheet molding male die by increasing the pressure at the front surface side of the decorated sheet to be higher than the pressure at the back surface side of the decorated sheet and/or decreasing the pressure at the back surface side of the decorated sheet to be lower than the pressure at the front surface side of the decorated sheet while pressing the at least one sheet molding male die from the back surface side of the decorated sheet and moving the arm means backwards.

In the above method for manufacturing a sheet molded body, it is possible that the arm means contacts the decorated sheet so as to divide an area inside the periphery portion into a plurality of sections in the inversion process; and a plurality of the sheet molding male dies is pressed against a corresponding one of the plurality of sections divided by the arm means in the sheet molding process.

The method for manufacturing an insert molded body according to the present invention includes: a draping process in which a pressure at a front surface side of a heated decorated sheet is lowered as compared to a pressure at a back surface side of the decorated sheet so that the decorated sheet expands toward the front surface side; an inversion process in which an arm means is moved toward the decorated sheet from the back surface side of the decorated sheet so that the arm means contacts at least a periphery portion of the decorated sheet, and while supporting the decorated sheet by the arm means in this manner, the decorated sheet is expanded towards the back surface side by increasing the pressure at the front surface side of the decorated sheet as compared to the pressure at the back surface side of the decorated sheet; a sheet molding process in which the decorated sheet is three dimensionally molded along a surface of at least one sheet molding male die by increasing the pressure at the front surface side of the decorated sheet to be higher than the pressure at the back surface side of the decorated sheet and/or decreasing the pressure at the back surface side of the decorated sheet to be lower than the pressure at the front surface side of the decorated sheet, while pressing the at least one sheet molding male die from the back surface side of the decorated sheet and moving the arm means backwards; an engagement process in which the sheet molding male die is relatively moved to at least one cavity, which is to be engaged with the sheet molding male die, formed on an injection molding female die while retaining the three dimensionally molded decorated sheet on the surface of the sheet molding male die, and the sheet molding male die is engaged with the cavity of the injection molding female die; a sheet absorption process in which the front surface side of the decorated sheet is absorbed onto the injection molding female die; and an integration process in which, after separating the sheet molding made die from the decorated sheet, the cavity is engaged with the injection molding male die and a resin is injected into the cavity to form an insert molded body in which the decorated sheet is integrated with a resin molded body.

In the above method for manufacturing an insert molded body according to the present invention, it is possible that the arm means contacts the decorated sheet so as to divide an area inside the periphery portion into a plurality of sections in the inversion process; a plurality of the sheet molding male dies is pressed against a corresponding one of the plurality of sections divided by the arm means in the sheet molding process; and the plurality of the sheet molding male dies is engaged with a corresponding one of the plurality of cavities formed on the injection molding female die in the engagement process.

Also, it is preferable that the decorated sheet is electrostatically absorbed by the injection molding female die, which is electrically insulated and subjected to an electrification treatment, in the sheet absorption process.

Moreover, it is preferable that a heated gas is supplied through a plurality of air holes formed on a surface of the sheet molding male die towards the outside in the sheet absorption process.

According to the method for manufacturing a sheet molded body of the present invention, a sheet molded body having a desired three dimensional shape and an excellent quality of the design may be obtained, without generating crease, by uniformly expanding a decorated sheet prior to molding the decorated sheet in a three dimensional shape, and closely contacting the decorate sheet to the surface of the male die. Also, by especially using an arm means which is capable of making contact the decorated sheet so as to divide an area inside the periphery portion thereof into a plurality of sections, it becomes possible to simultaneously produce a plurality of sheet molded bodies having an excellent appearance. Accordingly, by forming a sheet molded body using the above-mentioned method and integrating the sheet molded body with a resin molded body, it becomes possible to manufacture an insert molded body having an excellent appearance in which the sheet molded body closely contacts the resin molded body in an excellent manner.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE PREFERRED EMBODIMENTS

The invention summarized above and defined by the enumerated claims may be better understood by referring to the following detailed description, which should be read with reference to the accompanying drawings. This detailed description of particular preferred embodiments, set out below to enable one to build and use particular implementation of the invention, is not intended to limit the enumerated claims, but to serve as particular examples of the invention.

Figure 1:
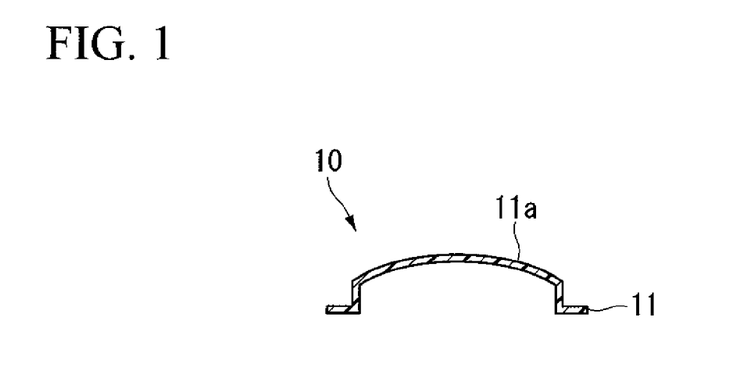
FIG. 1 is a cross-sectional view showing an example of the sheet molded body produced by the manufacturing method according to the present invention.

FIG. 1 shows an example of a sheet molded body 10 obtained by a manufacturing method according to the present invention in which a decorated sheet 11 having a front surface 11a which is designed with a pattern, etc., is three-dimensionally formed.

Figure 2:
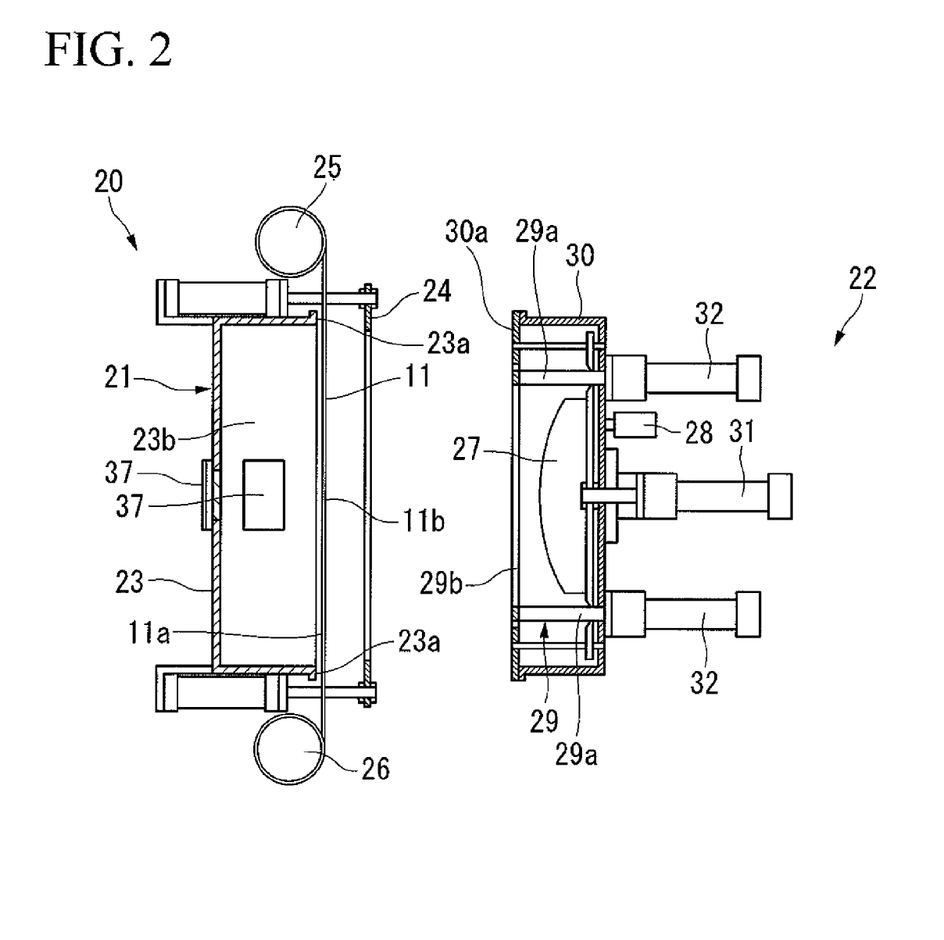
FIG. 2 is a schematic structural diagram showing an example of the sheet molding device used in the manufacturing method according to the present invention.

The sheet molded body 10 may be formed by using a device such as a sheet molding device 20 shown in FIG. 2 and sequentially carrying out a draping process in which the decorated sheet 11 is expanded, an inversion process in which an expanded direction of the decorated sheet 11 is altered, and a sheet molding process in which the decorated sheet 11 is three-dimensionally formed.

The sheet molding device 20 is mainly constituted by a sheet fixing part 21 which fixes the decorated sheet 11, and a movable molder part 22 which is disposed so as to oppose the sheet fixing part 21 and three-dimensionally forms the fixed decorated sheet 11.

The sheet fixing part 21 includes a box-shaped sheet fixing base 23 having an opened side which is to be covered by the decorated sheet 11 so as to seal the space inside and maintain airtightness therein, and a sheet clamp 24 for fixing the decorated sheet 11 on the sheet fixing base 23. In FIG. 2, the numerals 25 and 26 indicate a feed roll and a wind-up roll, respectively, and the decorated sheet 11 is placed between these rollers along an open end surface 23a of the sheet fixing base 23, and is fixed by the sheet clamp 24. Also, the sheet fixing part 21 is provided with a pressure control means (not shown in the figure) so that the pressure in a space 23b formed by the box-shaped sheet fixing base 23 and the fixed decorated sheet 11 may be controlled by sucking the air in the airtight space 23b or by supplying a pressurized gas, such as a compressed air, in the space 23b. The numeral 37 in the figure indicates a window which is provided so that an operator may confirm the state inside the sheet fixing base 23 from outside.

The movable molder part 22 includes a sheet molding male die 27 whose surface is a mold area, and the decorated sheet 11 is formed by pressing the sheet molding male die 27 almost perpendicular to the sheet surface from a back surface 11b side of the decorated sheet 11 which is fixed to the sheet fixing part 21. The sheet molding male die 27 in this example is attached to a frame body 30 by means of a cylinder 31 so that it may reciprocate in a substantially vertical direction with respect to the sheet surface of the decorated sheet 11. Note that the inside of the frame body 30 of the movable molder part 22 becomes airtight when a front end surface 30a of the frame body 30 makes contact with the open end surface 23a of the sheet fixing part 21 via the decorated sheet 11 as will be described later.

Figure 3A:
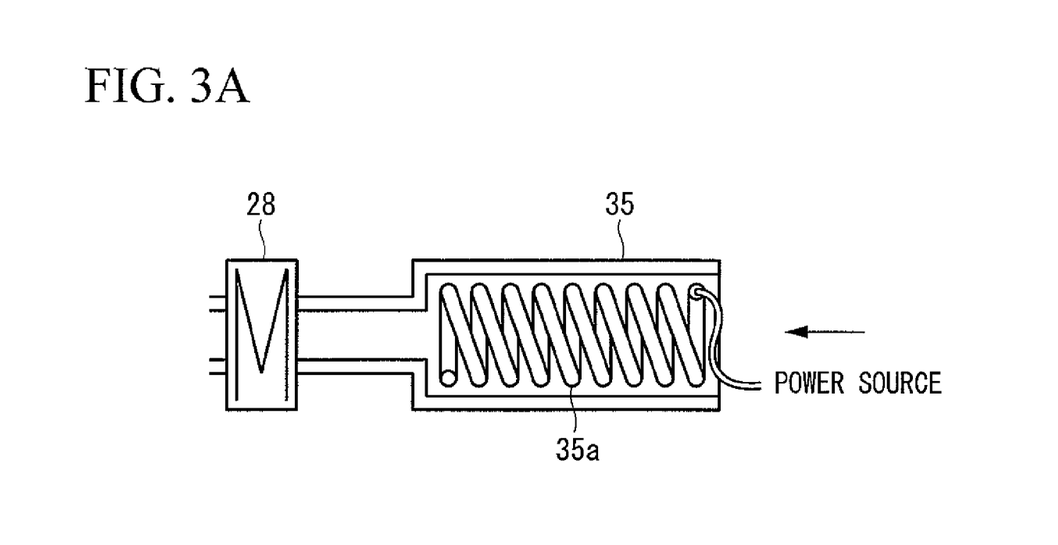
FIGS. 3A and 3B are diagrams for explaining a heated gas supply means provided with a sheet molding male die of a sheet molding device shown in FIG. 2.
Figure 3B:
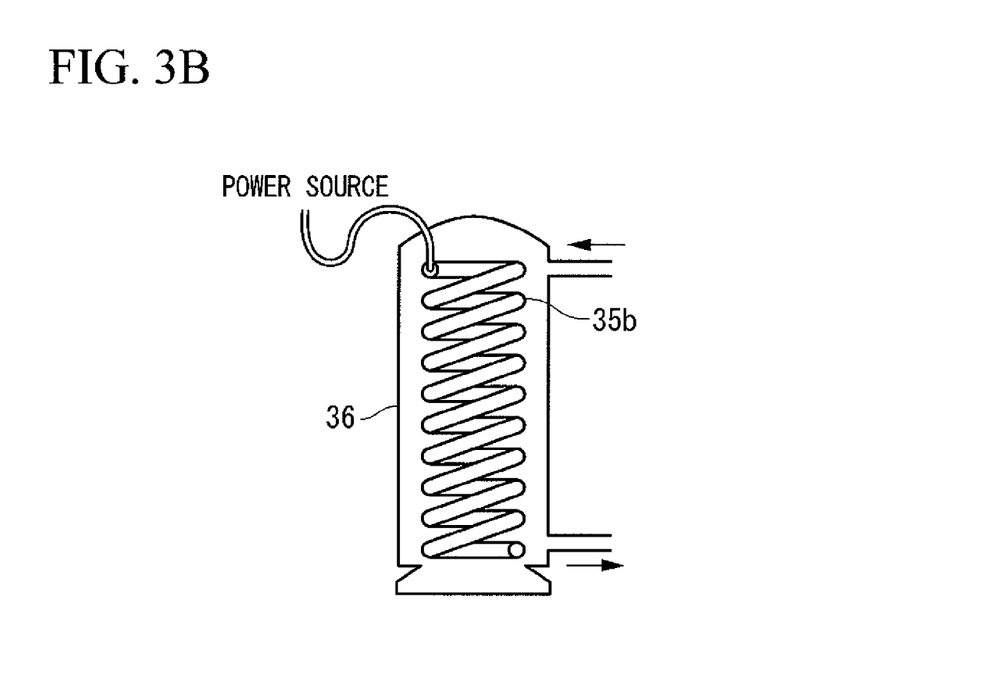

Also, the sheet molding male die 27 in this example includes a heating means (not shown in the figures) so that the surface thereof may be heated to a predetermined temperature. Moreover, the sheet molding male die 27 in this example has a number of air holes (not shown in the figures) on the surface thereof, and a heated gas supply means (not shown in the figures) and a pressure reducing means (not shown in the figures) are connected to the air holes via a open-close valve 28. Accordingly, a heated gas may be supplied from the inside of the sheet molding male die 27 towards the outside thereof via the air holes by using the heated gas supply means, and the decorated sheet 11 may be sucked onto the surface of the sheet molding male die 27 and maintained thereon by using the pressure reducing means as described later. Examples of the heated gas supply means include one in which a heater portion 35 having a heating wire 35a, is disposed upstream of the open-close valve 28 and a heated gas is provided by supplying a gas from a further upstream side of the heater portion 35 as indicated by an arrow shown in FIG. 3A. Note that it is preferable to preheat the gas which is supplied from the further upstream side by using a device, such as a heated gas compressing tank 36 provided with a heating wire 35b as shown in FIG. 3(b). It becomes possible to efficiently supply a heated gas by forming a two-stage heated gas supply means as explained above and supplying the heated gas via the open-close valve 28.

The movable molder part 22 further includes an arm means 29 which makes contact with the decorated sheet 11 by moving almost perpendicular to the sheet surface from the back surface 11b side of the decorated sheet 11 which is fixed to the sheet fixing part 21 towards the front surface 11a side thereof, and supports the decorated sheet 11. The arm means 29 in this example includes four arm members 29a which are attached to the frame body 30 by the respective cylinder 32 and reciprocate in a substantially vertical direction with respect to the sheet surface of the decorated sheet 11, and a sheet supporting member 29b of a rectangular frame shape which is provided so as to link the end of each of the arm members 29a, and the four arm members 29a are disposed in parallel around the sheet molding male die 27. Accordingly, the sheet supporting member 29b presses and supports, in a rectangular frame shape, the periphery of the decorated sheet 11, which is outside the area of the decorated sheet 11 pressed by the sheet molding male die 27. Note that although only two of the four arm members 29b are shown in the figure, the rest of the arm members are hidden by the two members shown.

Next, a method for manufacturing the sheet molded body 10 of one piece from the decorated sheet 11 of one piece by using the sheet molding device 20 will be explained in detail.

Figure 4:
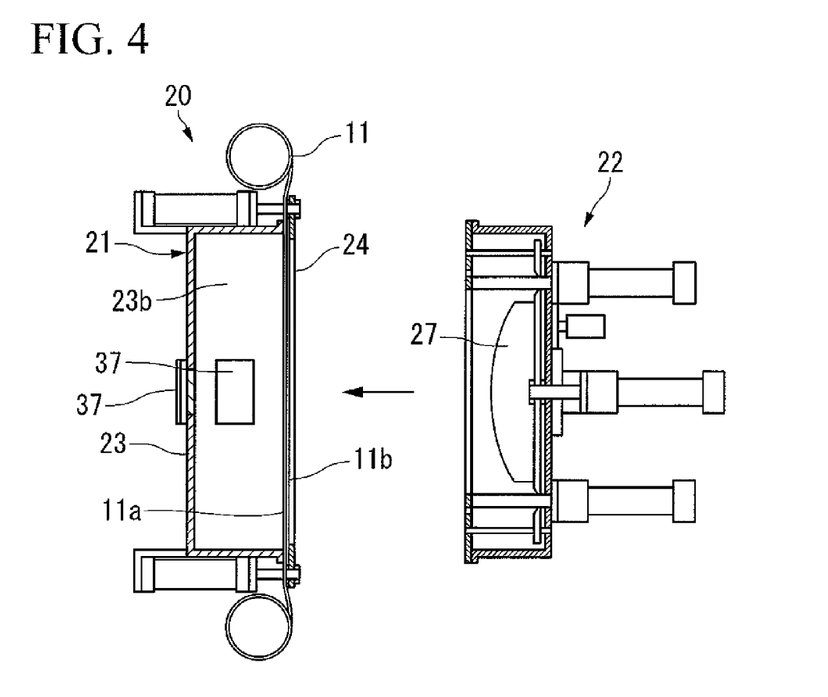
FIG. 4 is a diagram for explaining an example of the manufacturing method according to the present invention in which the decorated sheet is fixed to a predetermined position.

First, as shown in FIG. 2, the decorated sheet 11 is placed in front of the open end surface 23a of the sheet fixing base 23 while supplying the decorated sheet 11 from the feed roll 25 and winding it up by the wind-up roll 26. On the other hand, the surface of the sheet molding male die 27 is heated to a predetermined temperature. After this, as shown in FIG. 4, the decorated sheet 11 is fixed on the open end surface 23a of the sheet fixing base 23 by using the sheet clamp 24. At this time the decorated sheet 11 is fixed so that the front surface 11a side directly contacts the open end surface 23a and the back surface 11b side faces towards the movable molder part 22.

Then, the draping process is carried out in which the decorated sheet 11, which is fixed to the sheet fixing base 23, is expanded in order to make it more easily be processed.

Figure 5:
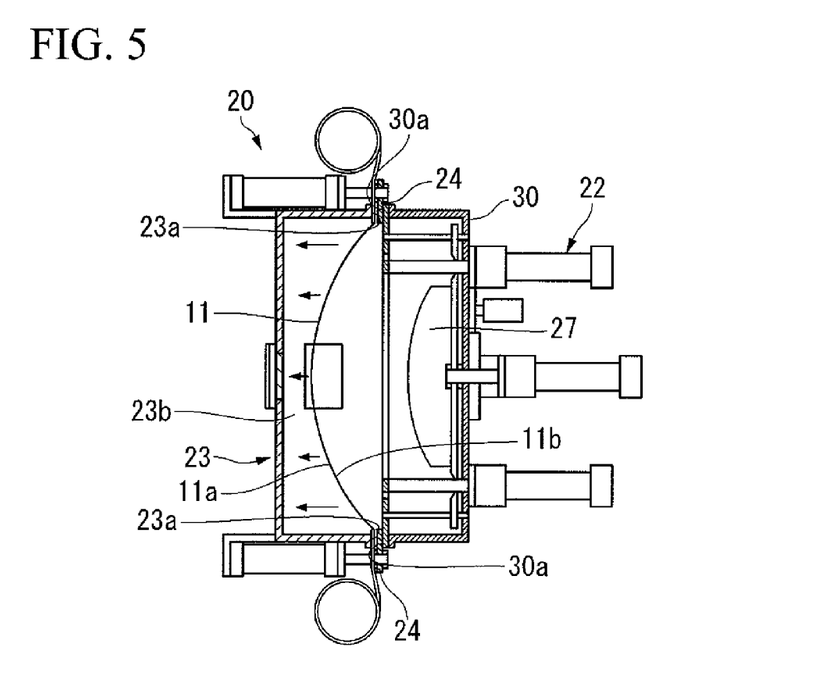
FIG. 5 is a diagram for explaining a draping process of an example of the manufacturing method according to the present invention.

More specifically, as shown in FIG. 5, the movable molder part 22 is moved towards the sheet fixing part 21 so that the front end surface 30a of the frame body 30 of the movable molder part 22 makes close contact with the open end surface 23a of the sheet fixing base 23 via the fixed decorated sheet 11 and the sheet clamp 24. Then, the decorated sheet 11 is heated to a predetermined temperature and softened by using a sheet heating means (not shown in the figure) disposed at a bottom surface (a surface opposed to the opened portion) of the sheet fixing base 23. Subsequently, a pressure control means provided with the sheet fixing base 23 is operated so as to suck the air inside the space 23b surrounded by the sheet fixing base 23 and the decorated sheet 1, and realizes a depressurized state of about 45 to 55 kPa. In this manner, the draping process is performed in which the pressure of the front surface 11a side of the decorated sheet 11 is lowered as compared to that of the back surface 11b side so that the decorated sheet 11 is expanded towards the front surface 11a side as shown in the figure to be a balloon shape.

Figure 6:
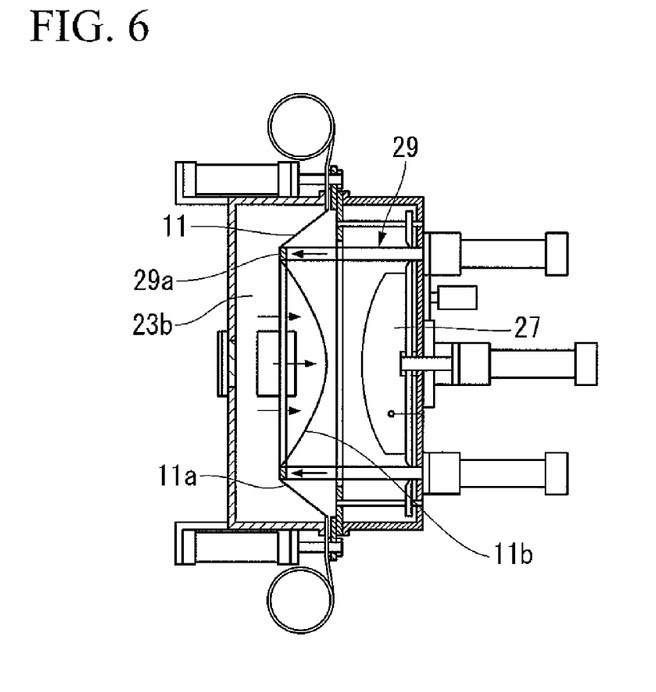
FIG. 6 is a diagram for explaining an inversion process of an example of the manufacturing method according to the present invention.

Then, as shown FIG. 6, the arm means 29 is moved from the back surface 11b side of the expanded decorated sheet 11 so that the sheet supporting portion 29b thereof makes contact and supports the periphery of the decorated sheet 11. After this, the pressure inside the space 23b is increased so that the pressure of the front surface 11a side of the decorated sheet 11 becomes higher than that of the back surface 11b side. In this manner, the inversion process in which the decorated sheet 11 is expanded towards the back surface 11b side as shown in the figure is carried out. Note that the "periphery" of the decorated sheet 11 means a portion outside the area which are pressed by the sheet molding male die 27 to be described later.

By carrying out the draping process as well as the inversion process as explained above, the decorated sheet 11 is extremely evenly expanded and a state is realized in which a portion which is slightly outside the portion to be pressed by the sheet molding male die 27 and which is inside the open end surface 23a of the sheet fixing base 23 is supported.

Figure 7:
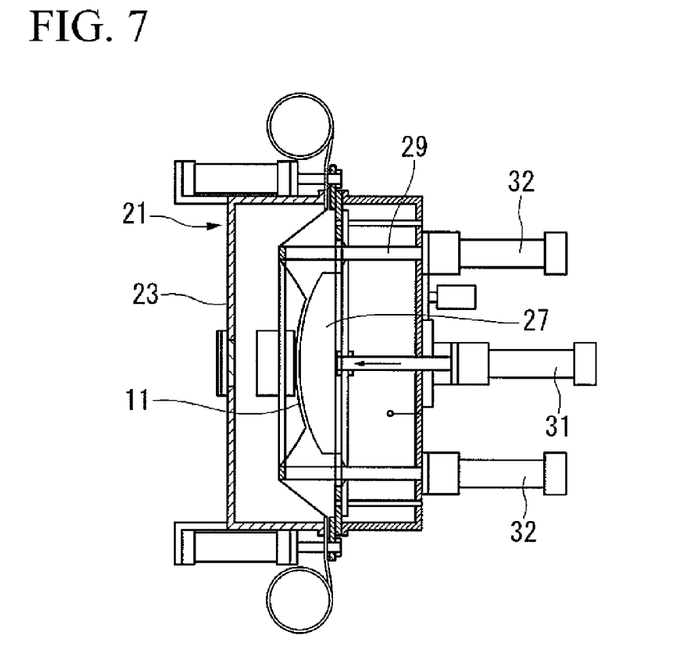
FIG. 7 is a diagram for explaining a sheet molding process of an example of the manufacturing method according to the present invention.
Figure 8:
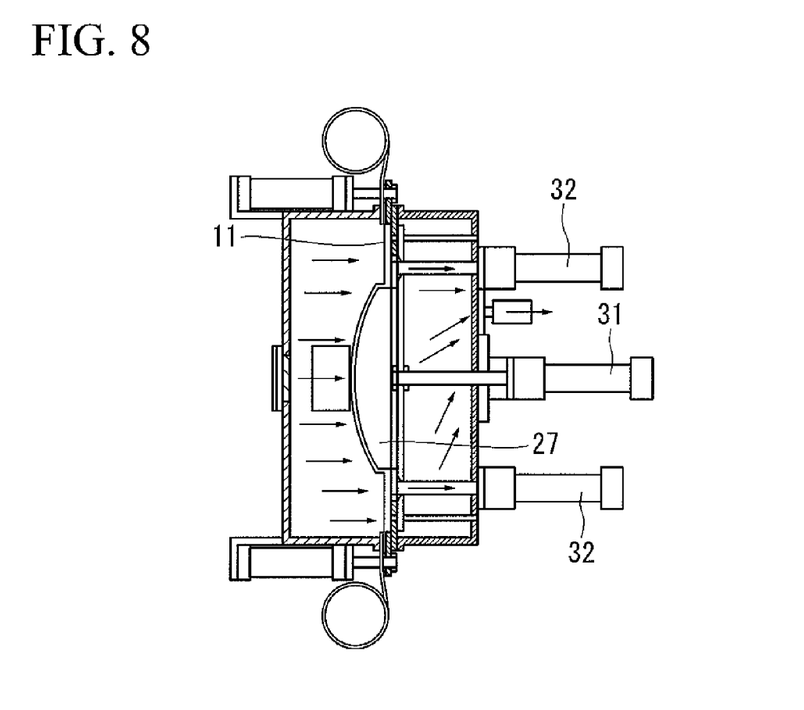
FIG. 8 is also a diagram for explaining a sheet molding process of an example of the manufacturing method according to the present invention.

Then, as shown in FIGS. 7 and 8, the sheet molding male die 27 is moved forward to the decorated sheet 11, which is expanded towards the back surface 11b side in the inversion process, so that the decorated sheet 11 is pressed from the back surface 11b side. On the other hand, the pressure of the front surface 11a side of the decorated sheet 11 is made higher than that of the back surface 11b side by supplying a pressurized gas, such as a compressed air, which is pressurized to about 200 to 500 kPa from the front surface 11a side towards the decorated sheet 11 while pressing the sheet molding male die 27, moving the arm means 29 backward, and operating the pressure control means of the sheet fixing part 21. As a result, the decorated sheet 11 makes close contact along the surface of the sheet molding male die 27, and is three-dimensionally formed having a shape along the surface of the sheet molding male die 27 (the sheet molding process).

Figure 9:
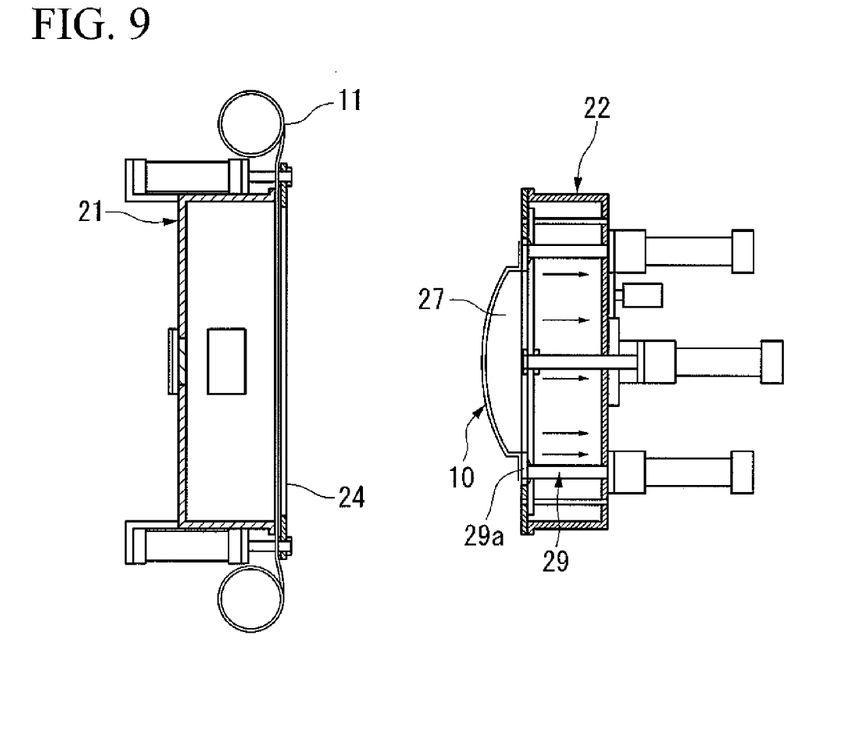
FIG. 9 is a diagram for explaining an example of the manufacturing method according to the present invention in which a sheet molded body is retained on the surface of the sheet molding male die.

After this, the decorated sheet 11 is sucked onto the surface of the sheet molding male die 27 and securely retained by operating a depressurizing means (not shown in the figures). Then, as shown in FIG. 9, the supply of pressurized air is stopped and the three-dimensionally formed decorated sheet 11 is cut by using a heat cutter (not shown in the figures) which is provided with the sheet fixing part 21, and while the sheet molded body 10 is sucked and retained on the surface of the sheet molding male die 27, the movable molder part 22 is moved away from the sheet fixing part 21. Note that the portion of the decorated sheet 11 cut by the heat cutter is outside the area pressed and supported by the sheet supporting portion 29b.

According to the sheet molding process as explained above, the sheet molding male die 27 is moved towards the decorated sheet 11, which is expanded towards the back surface 11b side while being supported by the arm means 29 in the inversion process, from the back surface 11b side. Therefore, the decorated sheet 11 firstly contacts the center portion, which is the top part, of the sheet molding male die 27, and then the decorated sheet 11 gradually contacts the periphery of the sheet molding male die 27. Accordingly, air does not tend to remain between the decorated sheet 11 and the surface of the sheet molding male die 27, and these closely contact to each other in an excellent manner. Also, since the pressure of the front surface 11a side of the decorated sheet 11 is further increased by supplying a pressurized air, etc. while moving the arm means 29 backwards, the contact of the sheet molding male die surface with the decorated sheet 11 proceeds smoothly from the center portion to the periphery portion, and an excellent contact state thereof may be achieved. Therefore, according to the method explained above, the molded body 10 of a desired three dimensional shape along the sheet molding male die surface having no crease due to remaining air between the decorated sheet 11 and the sheet molding male die surface, may be obtained in a stable manner. Also, since the decorated sheet 11 is uniformly expanded in the draping process and there is no difference in the degree of expansion within the decorated sheet 11, there is no such cases that a pattern of the sheet molded body 10 appears to be partially different to compromise the quality of the design, or crease is generated due to partially thin parts of the sheet molded body 10.

Note that in the sheet molding process, other than the method in which the pressure of the front surface 11a side of the decorated sheet 11 is further increased by supplying a pressurized air, etc. while moving the arm means 29 backwards, another method in which the pressure of the back surface 11b side of the decorated sheet 11 is lowered as compared to that of the front surface 11a side may be employed together with or without the above-mentioned method.

For cases where an insert molded body is manufactured by using the sheet molded body 10 obtained above, the following method may be employed.

Figure 10:
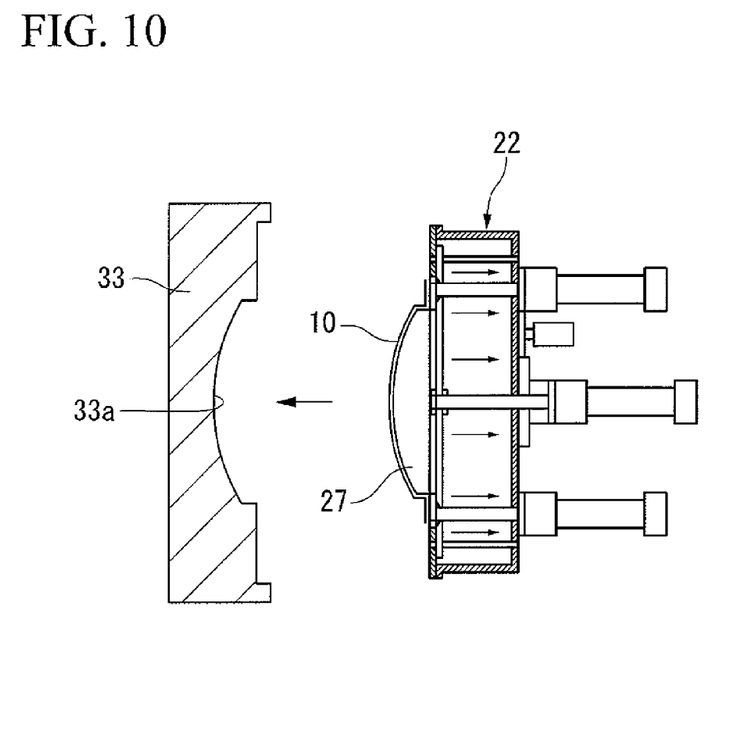
FIG. 10 is a diagram for explaining an engagement process of an example of the manufacturing method according to the present invention.
Figure 11:
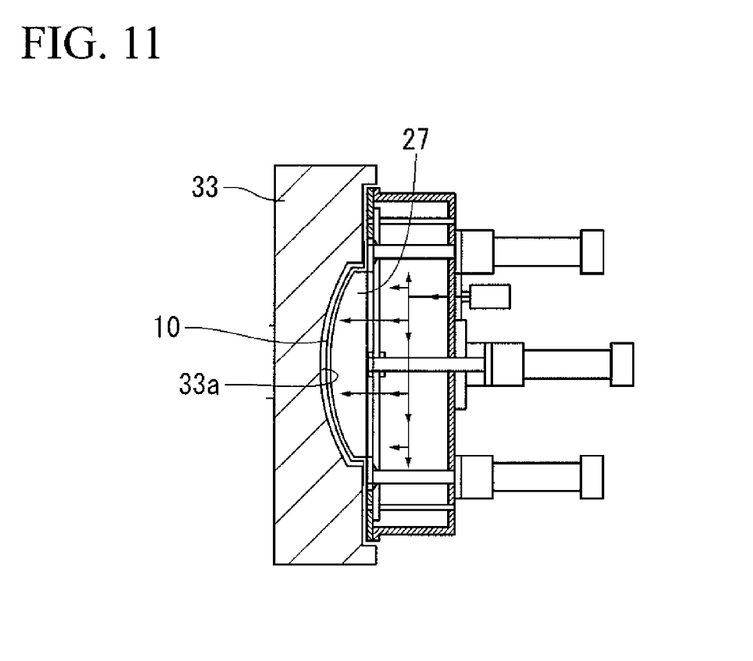
FIG. 11 is also a diagram for explaining an engagement process of an example of the manufacturing method according to the present invention.

That is, as shown in FIG. 10, after carrying out the above-mentioned sheet molding process, while a decorated sheet which is three-dimensionally formed on the surface of the sheet molding male die 27, i.e., the sheet molded body 10, is sucked and retained, an engagement process is carried out in which the movable molder part 22 is moved towards a cavity, which is to be engaged with the sheet molding male die 27, of an injection molding female die 33 which has been electrically insulated and subjected to an electrification treatment, so that the sheet molding male die 27 is engaged with the cavity of the injection molding female die 33.

Since the injection molding female die 33 is electrically insulated and is subjected to an electrification treatment, the sheet molded body 10 moves towards a molding surface 33a by an electrostatic absorption in the engagement process. At that time, a heated gas supply means (not shown in the figure) provided with the sheet molding male die 27 is operated so that a heated gas is supplied to the sheet molded body 10 from the air holes formed on the surface of the sheet molding male die 27. Since the sheet molded body 10 is heated and softened in this manner, it contacts more closely along the molding surface 33a. Also, by moving the arm means 29 forward to press the periphery of the sheet molded body 10 against the molding surface 33a of the cavity when the sheet molded body 10 is moved in the above-mentioned manner, it becomes possible to smoothly carry out the movement.

Figure 12:
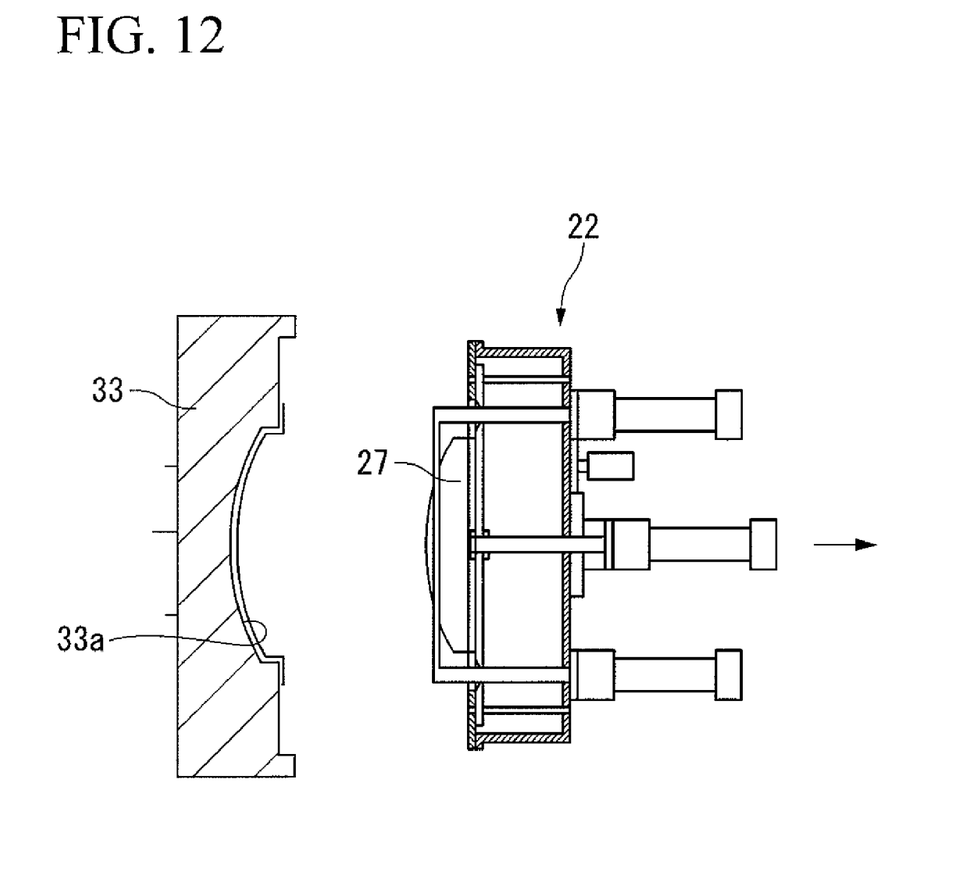
FIG. 12 is a diagram for explaining an example of the manufacturing method according to the present invention in which the sheet molded body is retained at a predetermined position of an injection molding female die.

After this, as shown in FIG. 12, the movable molder part 22 is moved away from the injection molding female die 33 so that the sheet molding male die 27 is separated from the sheet molded body 10 retained in the cavity.

Then, after engaging an injection molding male die (not shown in the figure) with the cavity for a mold close, an integration process for forming an insert molded body in which the sheet molded body 10 made of the decorated sheet 11 is integrated with a molded body made of a resin is formed by injecting a melted resin into the cavity is carried out.

In the above-mentioned manufacturing method of an insert molded body, since the sheet molded body 10 is formed by a method in which the sheet molding male die 27 is pressed from the back surface 11b side of the decorated sheet 11, which is uniformly expanded in the draping process, while operating the arm 29 and relatively increasing the pressure at the front surface 11a side of the decorated sheet 11, the sheet molded body 10 having no crease on the surface, which possesses a desired three dimensional shape along the surface of the sheet molding male die 27, a uniform pattern, and an excellent design quality, may be obtained in a stable manner. Accordingly, the insert molded body, which is obtained by integrating the sheet molded body 10 with a resin molded body, also possesses excellent appearance and a quality of design, in which the sheet molded body 10 and the resin molded body closely contact to each other. Also, in the above-mentioned manufacturing method, since the sheet molding male die 27 is moved relative to the cavity of the injection molding female die 33, which has a shape to be engaged with the sheet molding male die 27, so that these are engaged (engagement process) while retaining the sheet molded body 10 on the surface of the sheet molding male die 27, and the sheet molded body 10 is absorbed onto the injection molding female die 33 (sheet absorption process), it becomes possible to smoothly transfer the sheet molded body 10 to prevent damage or generation of crease.

Also, when the sheet absorption process is carried out by an electrostatic absorption utilizing electrification of the injection molding female die 33, it becomes possible to absorb the sheet molded body 10 in a stable manner.

Moreover, by supplying a heated gas from the plurality of air holes formed on the surface of the sheet molding male die 27 towards outside at that time, the sheet molded body 10 is heated and softened so that it more closely contacts along the molding surface 33a of the cavity.

Furthermore, although an electrostatic absorption is used as an example in the sheet absorption process, the absorption method is not limited to the electrostatic absorption, and it is possible to employ a suction absorption which uses an injection molding female die provided with holes through which vacuum suction may be carried out.

Note that the sheet molding device 20 which includes one piece of the sheet molding male die 27 and the movable molder part 22 provided with the arm means 29 in which the sheet supporting portion 29 is a rectangular shape, which is disposed so as to oppose the sheet fixing part 21, is shown in the above-mentioned embodiment, and the method for manufacturing the sheet molded body 10 of one piece from the fixed decorated sheet 11 of one piece has been explained so far. However, it is possible to produce a plurality of sheet molded bodies from one piece of the decorated sheet 11 fixed to a sheet fixing part by using, as an arm means, a means provided with a sheet supporting portion generally having a base frame of rectangular shape and at least one sub-frame which is disposed so as to divide inside of the base frame into a plurality of sections, and using a movable molder part provided with a plurality of sheet molding male dies, each of which corresponds to the respective section of the decorated sheet which is divided and supported by the sheet supporting portion. Also, by using one which is provided with a plurality of cavities as the injection molding female die, it becomes possible to produce a plurality of insert molded body.

Figure 13:
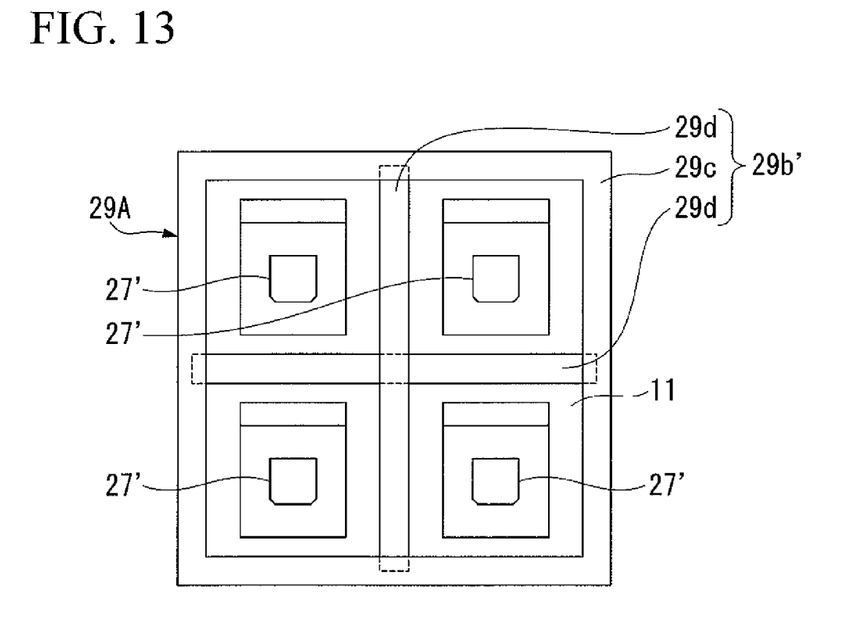
FIG. 13 is a diagram for explaining another example of the manufacturing method according to the present invention, which mainly shows an arm means used in an inversion process.

More specifically, as shown in FIG. 13, an arm means 29A provided with a sheet supporting portion 29b' which is generally configured by a base frame 29c of rectangular shape and two sub-frames 29d which divide the inside of the base frame 29c into four sections is used. When the arm means 29A contacts the decorated sheet 11, the base frame 29c contacts the periphery portion of the single decorated sheet 11 and supports it, and at the same time, the sub-frames 29d contact the area inside the periphery portion so as to divide the area into four sections and support the area. Then, by pressing four sheet molding male dies 27' against the respective divided section, it becomes possible to closely contact the decorated sheet 11 with the surface of each of the sheet molding male dies 27' and to simultaneously produce four sheet molded bodies of desired three dimensional shape, each of which has no crease and is excellent in the quality of the design. Also, by subsequently using an injection molding female die provided with four cavities, it becomes possible to simultaneously produce four insert molded bodies having an excellent appearance in which a sheet molded body closely contacts a resin molded body in an excellent manner. Note that if the sheet supporting portion of the arm means only includes a base frame of rectangular shape, crease may be generated due to insufficient contact between the decorated sheet and each of the sheet molding male dies.

Figure 14:
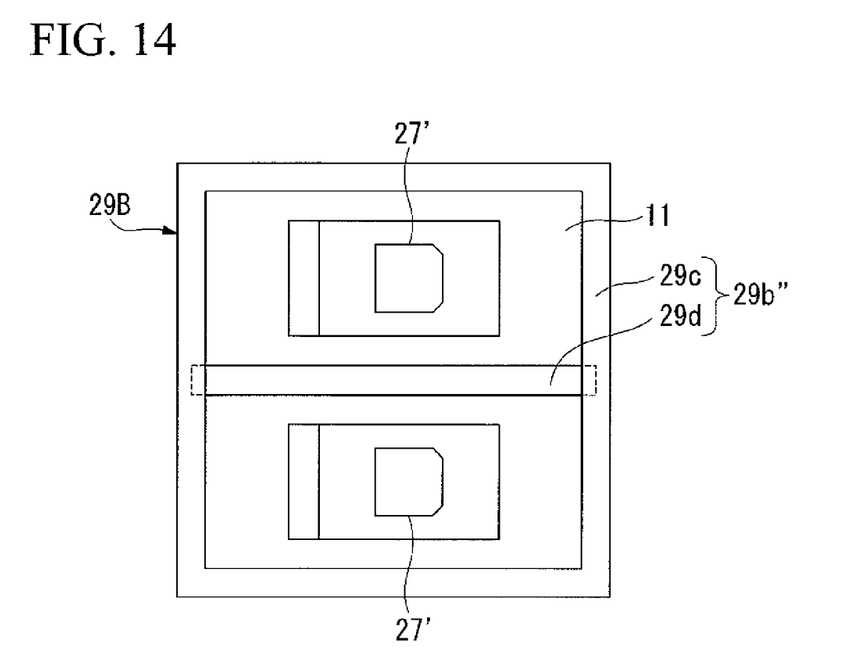
FIG. 14 is a diagram for explaining yet another example of the manufacturing method according to the present invention, which mainly shows an arm means used in an inversion process.

Note that the number of the sheet molded bodies and the insert molded bodies produced as above is not particularly limited, and as shown in FIG. 14, it is possible to simultaneously produce two of these by using one sub-frame 29d of the sheet supply portion 29" of the arm means 29B. It is also possible to produce a larger number of sheet molded bodies or insert molded bodies by using three or more of the sub-frames.

Moreover, it is possible to form a groove portion at an inside surface of the base frame so that a necessary number of sub-frames may be put in or take out from the grove portion depending on the number of sheet molded bodies or insert molded bodies to be produced. In this manner, even when the number of products to be produced is altered, it is possible to meet the demands by taking necessary steps using the same sheet molding device.

According to the above-mentioned method, since a plurality of sheet molded bodies of desired three dimensional shape having no crease on the surface which having uniform pattern of an excellent design quality may be simultaneously obtained from one decorated sheet, and a plurality of insert molded bodies having an excellent appearance and quality of the design in which a sheet molded body 10 and a resin molded body closely contact to each other, may also be obtained simultaneously, the method is extremely efficient.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the invention is limited and defined only by the following claims and equivalents thereto.

What is claimed is:

1. A method for manufacturing a sheet molded body, comprising:
   a draping process in which a pressure at a front surface side of a heated decorated sheet is lowered relative to a pressure at a back surface side of the decorated sheet so that the decorated sheet expands toward the front surface side;
   an inversion process carried out subsequent to the draping process in which an arm is moved toward the decorated sheet from the back surface side of the decorated sheet so that the arm contacts at least a periphery portion of the decorated sheet, and while supporting the decorated sheet by the arm in this manner, the decorated sheet is expanded towards the back surface side by increasing the pressure at the front surface side of the decorated sheet relative to the pressure at the back surface side of the decorated sheet, whereby the direction of the decorated sheet is inverted; and
   a sheet molding process carried out subsequent to the inversion process in which the decorated sheet is three dimensionally molded along a surface of at least one sheet molding male die by increasing the pressure at the front surface side of the decorated sheet to be higher than the pressure at the back surface side of the decorated sheet and/or decreasing the pressure at the back surface side of the decorated sheet to be lower than the pressure at the front surface side of the decorated sheet, while pressing the at least one sheet molding male die from the back surface side of the decorated sheet and moving the arm backwards.

2. the method for manufacturing a sheet molded body according to claim 1,
   wherein the arm contacts the decorated sheet so as to divide an area inside the periphery portion into a plurality of sections in the inversion process; and a plurality of the sheet molding male dies is pressed against a corresponding one of the plurality of sections divided by the arm in the sheet molding process.

3. A method for manufacturing an insert molded body, comprising:

a draping process in which a pressure at a front surface side of a heated decorated sheet is lowered as compared to a pressure at a back surface side of the decorated sheet so that the decorated sheet expands toward the front surface side;

an inversion process carried out subsequent to the draping process in which an arm is moved toward the decorated sheet from the back surface side of the decorated sheet so that the arm contacts at least a periphery portion of the decorated sheet, and while supporting the decorated sheet by the arm in this manner, the decorated sheet is expanded towards the back surface side by increasing the pressure at the front surface side of the decorated sheet as compared to the pressure at the back surface side of the decorated sheet, whereby the direction of the decorated sheet is inverted;

a sheet molding process carried out subsequent to the inversion process in which the decorated sheet is three dimensionally molded along a surface of at least one sheet molding male die by increasing the pressure at the front surface side of the decorated sheet to be higher than the pressure at the back surface side of the decorated sheet and/or decreasing the pressure at the back surface side of the decorated sheet to be lower than the pressure at the front surface side of the decorated sheet, while pressing the at least one sheet molding male die from the back surface side of the decorated sheet and moving the arm backwards;

an engagement process in which the sheet molding male die is relatively moved to at least one cavity, which is to be engaged with the sheet molding male die, formed on an injection molding female die while retaining the three dimensionally molded decorated sheet on the surface of the sheet molding male die, and the sheet molding male die is engaged with the cavity of the injection molding female die;

a sheet absorption process in which the front surface side of the decorated sheet is absorbed onto the injection molding female die; and an integration process in which, after separating the sheet molding made die from the decorated sheet, the cavity is engaged with the injection molding male die and a resin is injected into the cavity to form an insert molded body in which the decorated sheet is integrated with a resin molded body.

4. The method for manufacturing an insert molded body according to claim 3, wherein the arm contacts the decorated sheet so as to divide an area inside the periphery portion into a plurality of sections in the inversion process;

a plurality of the sheet molding male dies is pressed against a corresponding one of the plurality of sections divided by the arm in the sheet molding process; and the plurality of the sheet molding male dies is engaged with a corresponding one of the plurality of cavities formed on the injection molding female die in the engagement process.

5. The method for manufacturing an insert molded body according to claim 3, wherein the decorated sheet is electrostatically absorbed by the injection molding female die, which is electrically insulated and subjected to an electrification treatment, in the sheet absorption process.

6. The method for manufacturing an insert molded body according to claim 4, wherein the decorated sheet is electrostatically absorbed by the injection molding female die, which is electrically insulated and subjected to an electrification treatment, in the sheet absorption process.

7. The method for manufacturing an insert molded body according to claim 3, wherein a heated gas is supplied through a plurality of air holes formed on a surface of the sheet molding male die towards the outside in the sheet absorption process.

8. The method for manufacturing an insert molded body according to claim 4, wherein a heated gas is supplied through a plurality of air holes formed on a surface of the sheet molding male die towards the outside in the sheet absorption process.

9. The method for manufacturing an insert molded body according to claim 5, wherein a heated gas is supplied through a plurality of air holes formed on a surface of the sheet molding male die towards the outside in the sheet absorption process.

10. The method for manufacturing an insert molded body according to claim 6, wherein a heated gas is supplied through a plurality of air holes formed on a surface of the sheet molding male die towards the outside in the sheet absorption process.

* * * * *

UNITED STATES PATENT AND TRADEMARK OFFICE
CERTIFICATE OF CORRECTION

| | |
|---|---|
| PATENT NO. | : 7,625,516 B2 |
| APPLICATION NO. | : 11/849149 |
| DATED | : December 1, 2009 |
| INVENTOR(S) | : Aida et al. |

It is certified that error appears in the above-identified patent and that said Letters Patent is hereby corrected as shown below:

Title Page; Page 1, (Item 57) Abstract, Line 6, Change "decorate" to --decorated--.

Column 2, Line 37, After "sheet" insert --,--.

Column 3, Line 14, Change "made" to --male--.

Column 3, Line 43, Change "decorate" to --decorated--.

Column 5, Line 43, Change "a" to --an--.

Column 6, Line 45, Change "1," to --11,--.

Column 10, Line 15, Change "having" to --has--.

Column 10, Line 63, In Claim 2, change "the" to --The--.

Column 11, Line 47, In Claim 3, change "made" to --male--.

Signed and Sealed this

Eighteenth Day of May, 2010

David J. Kappos
*Director of the United States Patent and Trademark Office*